US008526915B2

(12) United States Patent
Kakiuchi et al.

(10) Patent No.: US 8,526,915 B2
(45) Date of Patent: Sep. 3, 2013

(54) USER EQUIPMENT, COMMUNICATION EQUIPMENT, AUTHENTICATION SYSTEM, AUTHENTICATION METHOD, AUTHENTICATION PROGRAM AND RECORDING MEDIUM

(75) Inventors: Takashi Kakiuchi, Kusatsu (JP); Erina Takikawa, Nara (JP)

(73) Assignee: OMRON Corporation, Kyoto (JP)

( * ) Notice: Subject to any disclaimer, the term of this patent is extended or adjusted under 35 U.S.C. 154(b) by 1265 days.

(21) Appl. No.: 11/724,591

(22) Filed: Mar. 15, 2007

(65) Prior Publication Data

US 2007/0287423 A1 Dec. 13, 2007

(30) Foreign Application Priority Data

Mar. 15, 2006 (JP) ................. 2006-071860

(51) Int. Cl.
*H04M 1/66* (2006.01)
(52) U.S. Cl.
USPC ....... 455/411; 455/410; 455/414.1; 455/41.2; 455/550.1
(58) Field of Classification Search
USPC ................ 455/411, 410, 414.1, 550.1, 552.1, 455/556.1; 713/150, 155, 168–173, 184, 713/186, 202; 705/14.5, 44, 64, 71
See application file for complete search history.

(56) References Cited

U.S. PATENT DOCUMENTS

| 7,137,003 | B2 * | 11/2006 | Krishnan et al. ............ 713/172 |
| 2001/0016486 | A1 * | 8/2001 | Ko ................. 455/411 |
| 2004/0005911 | A1 * | 1/2004 | Guirauton et al. ............ 455/558 |
| 2004/0005912 | A1 * | 1/2004 | Hubbe et al. ................ 455/558 |
| 2005/0215233 | A1 * | 9/2005 | Perera et al. ................ 455/411 |
| 2005/0224587 | A1 | 10/2005 | Shin et al. |
| 2005/0247670 | A1 | 11/2005 | Yamada et al. |
| 2005/0287988 | A1 * | 12/2005 | Nakamura .................. 455/411 |
| 2006/0107037 | A1 | 5/2006 | Lincoln et al. |
| 2006/0112275 | A1 | 5/2006 | Jeal et al. |
| 2006/0126422 | A1 | 6/2006 | Takagi et al. |
| 2007/0226805 | A1 | 9/2007 | Jeal et al. |

FOREIGN PATENT DOCUMENTS

| EP | 1 544 780 A1 | 6/2005 |
| JP | 2003-6549 | 1/2003 |
| JP | 2004055680 A | 2/2004 |
| JP | 2005-63342 | 3/2005 |
| JP | 2005-240478 | 9/2005 |
| JP | 2005303513 A | 5/2007 |

OTHER PUBLICATIONS

Korean Office Action for Korean Application No. 10-2007-0024812, mailed on Sep. 28, 2010, and English translation thereof (19 pages).

(Continued)

*Primary Examiner* — Kathy Wang-Hurst
(74) *Attorney, Agent, or Firm* — Osha Liang LLP

(57) ABSTRACT

Equipment to prevent spoofing in an authentication technique that uses a portable terminal and the like, includes an authentication unit for performing personal authentication of the user, a communication unit for communicating with a register, and an authentication control unit for permitting the authentication unit to execute the personal authentication of the user when receiving authentication start instructing information from the register connected to the communication unit. Spoofing is difficult to carry out because the authentication start instructing information must be received from the register in order to perform the required personal authentication prior to the post-authentication communication.

7 Claims, 6 Drawing Sheets

(56) References Cited

OTHER PUBLICATIONS

English Translation of Patent Abstract of Japan 2007115441 (A1), published May 10, 2007, (1 page).
Japanese Office Action in related Japanese Patent Application No. 2006-071860, mailed Feb. 15, 2011 (2 pages).
English Translation of Japanese Office Action in related Japanese Patent Application No. 2006-071860, mailed Feb. 15, 2011, (2 pages).
European Search Report for European Application No. 07104020.8-1244 dated May 10, 2010, 7 pages.
Office Action issued in corresponding European Application No. 07 104 020.8 dated Apr. 8, 2013 (4 pages).

* cited by examiner

USER EQUIPMENT, COMMUNICATION EQUIPMENT, AUTHENTICATION SYSTEM, AUTHENTICATION METHOD, AUTHENTICATION PROGRAM AND RECORDING MEDIUM

BACKGROUND OF THE INVENTION

1. Field of the Invention

The present invention relates to a user equipment for performing identity verification of the user of the equipment, a communication equipment, an authentication system, an authentication method, an authentication program and a recording medium.

2. Description of the Related Art

The need for security strengthening is increasing with widespread use of portable terminals and strengthening of functions. In particular, ensuring of security is an absolute requirement if functions directly related to financial transactions such as electronic money are equipped.

In order to respond to such need, living body authentication in which ensuring of security is relatively easy is proposed in addition to security measures such as personal identification number and password of the prior art. Among them, face authentication is an identification method normally performed by people in ordinary living, and is often adopted since psychological resistance is small, it can be achieved with small investment since devices that can perform imaging are increasing with widespread use of CCD (Charge Coupled Device) camera etc.

However, the problem of spoofing by person other than the person in question may arise in face authentication, similar to other authentication methods. For example, spoofing is easily carried out with passwords and personal identification numbers if the numbers are leaked through peeping. Regarding fingerprint authentication considered to have a relatively high security, spoofing by pseudo-finger has been reported. Spoofing is easily carried out using photographs since authentication is performed based on the image in the face authentication technique. This is significant in the authentication technique by portable terminal and the like that can perform authentication at any location rather than in the authentication technique performed by equipments arranged at a location that may attract public attention.

The prior art documents related to the present invention include Japanese Laid-Open Patent Publication No. 2003-006549 (date of publication: Jan. 10, 2003) and Japanese Laid-Open Patent Publication No. 2005-063342 (date of publication: Mar. 10, 2005).

In Japanese Patent Publication Laid-Open No. 2003-006549 (date of publication: Jan. 10, 2003), a configuration is disclosed in which a portable telephone with fingerprint authentication device capable of performing fingerprint authentication on the consumer and a register with cradle for relaying the communication with the portable telephone by arranging the portable telephone of a retail store are connected to the consumer account of the financial institution and the retail store account via the network, where the consumer presents the portable telephone when buying goods, the portable telephone is verified whether it is of the person in question using the fingerprint authentication device, and after being verified, the data of the payment is saved in the portable telephone and the register of the retail store, and the money is withdrawn from the financial institution specified by the consumer based on the data.

In Japanese Laid-Open Patent Publication No. 2005-063342, the user images his/her face using the camera of the portable telephone right before using the credit card, and transmits the photograph of the face to the credit card company along with the input password; and the credit card company permits the use of the credit card by the user during a predefined time after confirming that the photograph of the face and the password are registered in the database.

SUMMARY OF THE INVENTION

In view of the above problems, the present invention aims to provide a user equipment for preventing spoofing in an authentication technique that uses portable terminals and the like, a communication equipment, an authentication system, an authentication method, an authentication program and a recording medium.

In order to achieve the above aim, the user equipment according to the present invention relates to a user equipment for performing post-authentication communication with a communication equipment after personal authentication of the user; the user equipment including an authentication unit for performing the personal authentication of the user; a communication unit for communicating with the communication equipment; and an authentication control unit for permitting the authentication unit to execute the personal authentication of the user when receiving authentication start instructing information from the communication equipment connected to the communication unit.

A communication equipment according to the present invention relates to a communication equipment for performing post-authentication communication with an user equipment after personal authentication of the user; the communication equipment including a communication unit for communicating with the user equipment; and an authentication start instructing unit for transmitting authentication start instructing information permitting execution of the personal authentication of the user to the user equipment when the communication unit is connected to the user equipment.

An authentication system according to the present invention includes a user equipment and a communication equipment.

An authentication method according to the present invention relates to an authentication method in an authentication system, including a user equipment and a communication equipment, for performing personal authentication of the user of the user equipment before post-authentication communication; the method including the steps of transmitting authentication start instructing information for permitting execution of the personal authentication of the user from the communication equipment to the user equipment when the user equipment is connected to the communication equipment; and performing the personal authentication of the user by the user equipment after receiving the authentication start instructing information.

According to the above configuration, the user equipment triggers the reception of the authentication start instructing information from the communication equipment and performs personal authentication of the user. That is, the authentication start instructing information must first be received from the communication equipment when performing the post-authentication communication.

The user may use one or a combination of a plurality of signals of the signals received from the communication equipment as the authentication start instructing information when establishing a communication with the communication equipment. For example, the signal received first from the communication equipment may be used as the authentication start instructing information when establishing the communication. That is, the present invention assumes that the start of communication triggers the start of the authentication.

Therefore, spoofing becomes difficult to carry out since authentication cannot be performed with only the user equipment. For example, if the communication equipment is the register at the store front, the user who makes the payment must connect the user terminal to the register, and thus authentication is forced to be performed in front of the clerk, whereby spoofing becomes difficult to carry out.

After the user terminal receives the authentication start instructing information and enters the authenticable state, the user terminal does not need to be connected to the communication equipment during the authentication process. Consequently, the user performs authenticating operation with the user equipment at his/her hand.

Furthermore, in the user equipment according to the present invention, the authentication control unit permits the authentication unit to execute the personal authentication of the user only for a predetermined time after receiving the authentication start instructing information.

According to such configuration, the user equipment further allows the personal authentication of the user to be executed only for a predetermined time after receiving the authentication start instructing information from the communication equipment to be in the authenticable state. That is, after a predetermined time has elapsed after receiving the authentication start instructing information, the user equipment again returns to the non-authenticable state.

Therefore, spoofing becomes difficult to carry out since the user must perform the authentication within the predetermined time. For example, if the communication equipment is the register at the store front, the authentication must be performed until a predetermined time in which authentication is permitted has elapsed after connecting to the register to receive the authentication start instructing information, and thus the authentication is forced to be performed in front of the clerk.

Furthermore, the user equipment according to the present invention includes a post-authentication communication control unit for performing the post-authentication communication only for a predetermined time after the authentication unit succeeds in the personal authentication of the user.

According to the above configuration, the user equipment performs the personal authentication of the user with the reception of the authentication start instructing information from the communication equipment as the trigger, and enables the post-authentication communication between the user equipment and the communication equipment only for a predetermined time after succeeding in the personal authentication.

Therefore, the authentication start instructing information must be received from the communication equipment and the personal authentication of the user must be performed to perform the post-authentication communication, and the post-authentication communication must be performed within a predetermined time after succeeding in the authentication.

Thus, spoofing becomes difficult to carry out since the post-authentication communication must be performed within a predetermined time after succeeding in the authentication in addition to the fact that a state in which the post-authentication communication is possible is not obtained with only the user equipment. For example, when the communication equipment is a register at the store front, the user making the payment must connect the user terminal to the register, and thus authentication is forced to be performed in front of the clerk, whereby spoofing becomes difficult to carry out.

The user equipment according to the present invention relates to a user equipment for performing post-authentication communication with a communication equipment after personal authentication of the user; the user equipment including an authentication unit for performing the personal authentication of the user; a communication unit for communicating with the communication equipment; an authentication control unit, receiving first communication equipment identifying information identifying the communication equipment from the communication equipment connected to the communication unit; for storing the first communication equipment identifying information and permitting the authentication unit to execute the personal authentication of the user; and a post-authentication communication control unit, receiving second communication equipment identifying information identifying the communication equipment from the communication equipment connected to the communication unit after the authentication unit succeeds in the personal authentication of the user, for performing the post-authentication communication only when the second communication equipment identifying information matches the first communication equipment identifying information.

An authentication method according to the present invention relates to an authentication method in an authentication system, including a user equipment and a communication equipment, for performing personal authentication of the user of the user equipment before post-authentication communication; the method including the steps of transmitting first communication equipment identifying information identifying own equipment from the communication equipment to the user equipment when the user equipment is connected to the communication equipment; storing the first communication equipment identifying information received from the communication equipment by the user equipment; performing the personal authentication of the user by the user equipment after receiving the first communication equipment identifying information; transmitting second communication equipment identifying information identifying the own equipment from the communication equipment to the user equipment when the user equipment is connected to the communication equipment after the user equipment succeeds in the personal authentication of the user; determining whether the first communication equipment identifying information and the second communication equipment identifying information match by the user equipment; and enabling post-authentication communication between the user equipment and the communication equipment only when the first communication equipment identifying information and the second communication equipment identifying information match.

According to the above configuration, the user performs the personal authentication of the user with the reception of the first communication equipment identifying information from the communication equipment as the trigger, receives second communication equipment identifying information from the communication equipment after succeeding in the personal authentication, and enables the post-authentication communication between the user equipment and the communication equipment only when the first communication equipment identifying information matches the second communication equipment identifying information.

Therefore, the communication equipment identifying information must first be received from the communication equipment and the personal authentication of the user must be performed to perform the post-authentication communication, and the opponent performing the post-authentication communication after succeeding in the authentication is limited to the communication equipment for transmitting the same communication equipment identifying information as the first communication equipment identifying information, that is, the communication equipment same as the first.

Thus, spoofing becomes difficult to carry out since connection with the same communication equipment is required in time of authentication and in time of post-authentication communication in addition to the fact that a state in which the post-authentication communication is possible is not obtained with only the user equipment. For example, when the communication equipment is a register at the store front, the user making the payment must connect the user terminal to the register, and thus authentication is forced to be performed in front of the clerk, whereby spoofing becomes difficult to carry out.

The user terminal only needs to be connected to the same communication equipment in time of authentication and in time of post-authentication communication, and does not need to be connected to the communication equipment during the authentication process. Thus, the user can perform the authenticating operation with the user equipment at his/her hand.

The user equipment and the communication equipment may be realized by a computer, in which case, the control program (authentication program) of the user equipment and the communication equipment for realizing the user equipment and the communication equipment with the computer by operating the computer as each unit; and a computer readable recording medium recorded with the same are encompassed within the scope of the present invention.

Therefore, the user equipment according to the present invention includes an authentication unit for performing the personal authentication of the user; a communication unit for communicating with the communication equipment; and an authentication control unit for permitting the authentication unit to execute the personal authentication of the user when receiving authentication start instructing information from the communication equipment connected to the communication unit.

The communication equipment according to the present invention includes a communication unit for communicating with the user equipment; and an authentication start instructing unit for transmitting authentication start instructing information permitting execution of the personal authentication of the user to the user equipment when the communication unit is connected to the user equipment.

An authentication system includes a user equipment and a communication equipment.

The authentication method according to the present invention includes the steps of transmitting authentication start instructing information for permitting execution of the personal authentication of the user from the communication equipment to the user equipment when the user equipment is connected to the communication equipment; and performing the personal authentication of the user by the user equipment after receiving the authentication start instructing information.

Therefore, spoofing becomes difficult to carry out since a state in which authentication can be performed is not obtained only with the user equipment. After receiving the authentication start instructing information and enters the authenticable state, the user terminal does not need to be connected to the communication equipment during the authentication process.

Therefore, the user can perform the authenticating operation with the user equipment at his/her hand.

The user equipment according to the present invention includes an authentication unit for performing the personal authentication of the user; a communication unit for communicating with the communication equipment; an authentication control unit, receiving first communication equipment identifying information identifying the communication equipment from the communication equipment connected to the communication unit; for storing the first communication equipment identifying information and permitting the authentication unit to execute the personal authentication of the user; and a post-authentication communication control unit, receiving second communication equipment identifying information identifying the communication equipment from the communication equipment connected to the communication unit after the authentication unit succeeds in the personal authentication of the user, for performing the post-authentication communication only when the second communication equipment identifying information matches the first communication equipment identifying information.

The authentication method according to the present invention includes the steps of transmitting first communication equipment identifying information identifying own equipment from the communication equipment to the user equipment when the user equipment is connected to the communication equipment; storing the first communication equipment identifying information received from the communication equipment by the user equipment; performing the personal authentication of the user by the user equipment after receiving the first communication equipment identifying information; transmitting second communication equipment identifying information identifying the own equipment from the communication equipment to the user equipment when the user equipment is connected to the communication equipment after the user equipment succeeds in the personal authentication of the user; determining whether the first communication equipment identifying information and the second communication equipment identifying information match by the user equipment; and enabling post-authentication communication between the user equipment and the communication equipment only when the first communication equipment identifying information and the second communication equipment identifying information match.

Therefore, the communication equipment identifying information must first be received from the communication equipment and the personal authentication of the user must be performed to perform the post-authentication communication, and the opponent performing the post-authentication communication after succeeding in the authentication is limited to the communication equipment transmitting the same communication equipment identifying information as the first communication equipment identifying information, that is, the communication equipment same as the first.

Therefore, spoofing becomes difficult to carry out since connection with the same communication equipment is required in time of authentication and in time of post-authentication communication in addition to the fact that a state in which post-authentication communication is possible not be obtained with only the user equipment.

DETAILED DESCRIPTION OF THE PREFERRED EMBODIMENTS

Embodiment 1

One embodiment of the present invention will now be described based on FIGS. 1 to 4.

Figure 2:
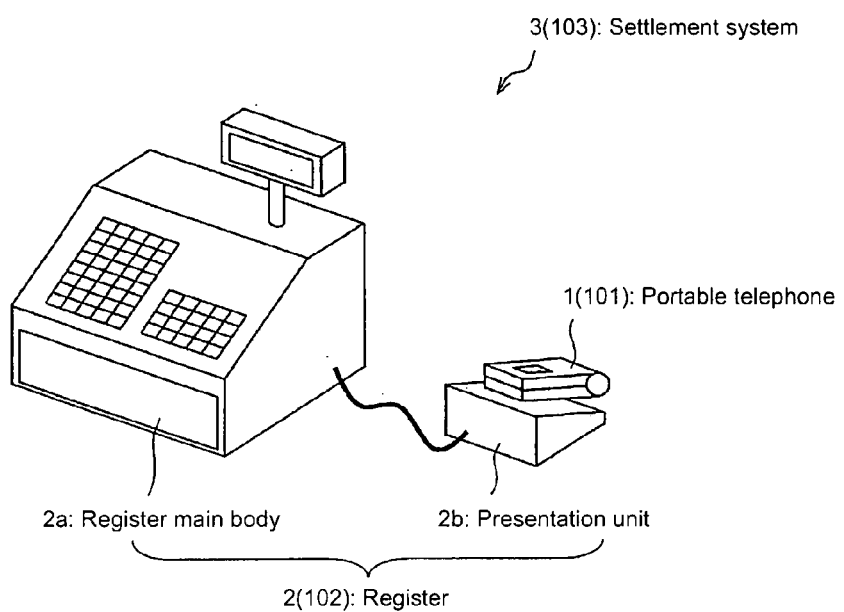
FIG. 2 shows an explanatory view showing the outer appearance of the portable telephone and the register shown in FIG. 1.

FIG. 2 is an explanatory view showing the outer appearance of a settlement system (authentication system) 3 according to the present embodiment. In the present embodiment, the settlement system for performing electronic money settlement at the store front using the portable telephone 1 will be described by way of example.

The settlement system 3 is configured by a register (communication equipment) 2 attached to a POS terminal at the store front and the like, and a portable telephone (user equipment) 1 having a settlement function and an authentication function. The settlement system 3 performs personal authentication of the user of the portable telephone (user equipment) 1 before communication (post-authentication communication) of the settlement process and the like that requires authentication of the user in advance. That is, the settlement system 3 authenticates the user of the portable telephone 1 and performs post-authentication communication with the register 2 if the authentication is successful.

Specific condition describing the present embodiment is a case of when the user makes the payment at the store front with electronic money settlement using the portable telephone 1 having non-contacting IC card function. This settlement is processed by performing the settlement process communication (post-authentication communication) with the portable telephone 1 brought close to the presentation unit 2b of the register 2 after the amount billed is input to the register main body 2a of the register 2 by the clerk, as shown in FIG. 2. In this case, the settlement process communication between the portable telephone 1 and the register 2 is performed by bringing the portable telephone 1 close to the presentation unit 2b of the register 2 with the settlement process communication in the unlocked state after succeeding in the personal authentication of the user at the portable telephone 1.

In the present embodiment, the portable telephone 1 is described by way of example of the user equipment, but the user equipment merely needs to be a terminal device equipped with a camera, and may be PDA (Personal Digital Assistance) or personal computer. The register 2 is described by way of example of the communication equipment, and the case of processing the post-authentication communication with the register 2 is described, but the communication equipment may be that which relays the post-authentication communication to external computer and the like. The settlement process communication may be performed by image information such as two-dimensional barcode in addition to electric wave of the non-contacting IC card. The authentication function may be other living body authentication such as fingerprint authentication and vein authentication in addition to the face authentication, or may be a combination of a plurality of authentications.

Figure 1:
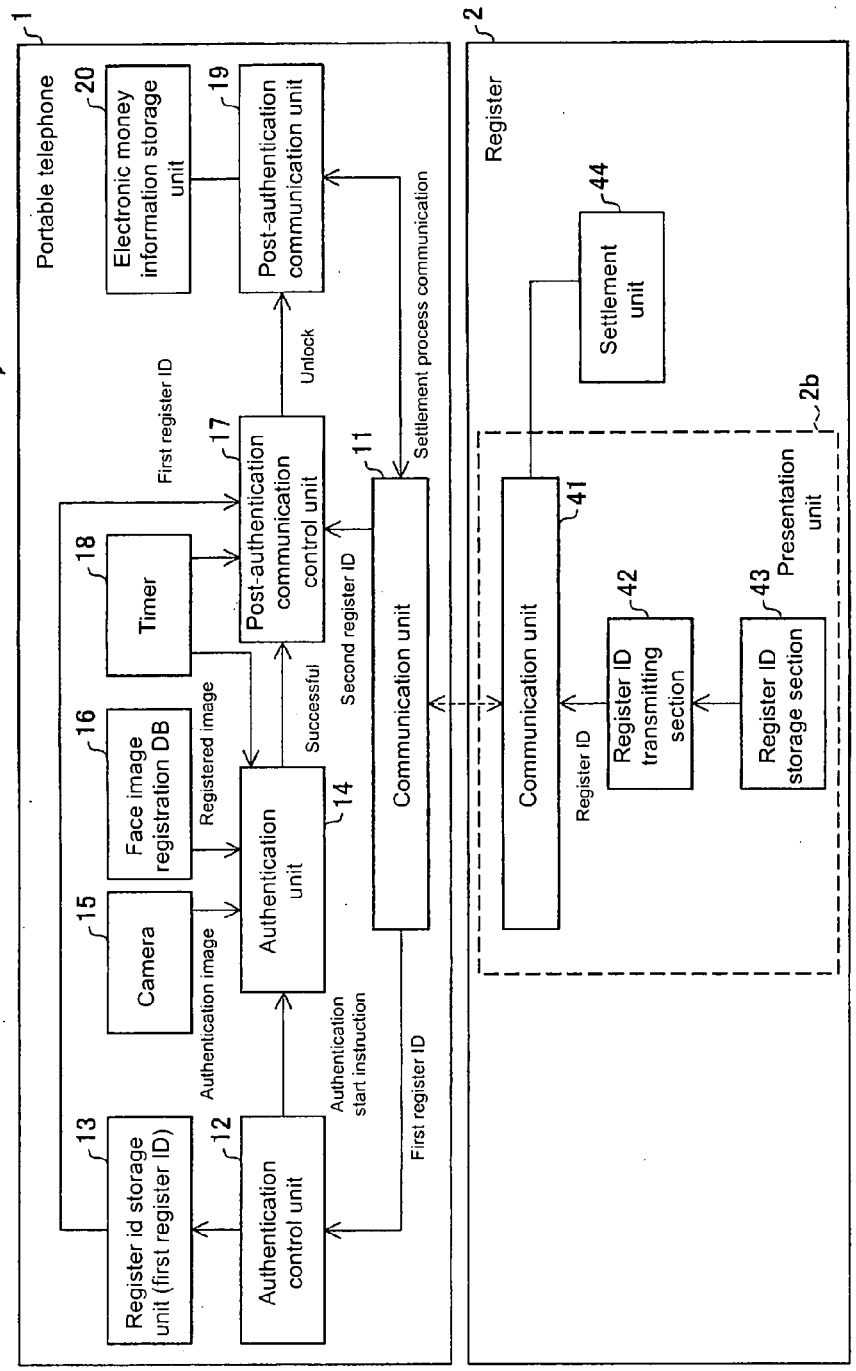
FIG. 1 shows a function block diagram showing a configuration of a portable telephone and a register according to one embodiment of the present invention.

FIG. 1 is a function block diagram showing a configuration of the portable telephone 1 and the register 2.

(Configuration of Portable Telephone 1)

As shown in FIG. 1, the portable telephone 1 includes a communication unit (communication devices) 11, an authentication control unit (authentication control devices) 12, a register ID storage unit 13, an authentication unit (authentication devices) 14, a camera (imaging devices) 15, a face image registration database (DB) 16, a post-authentication communication control unit (post-authentication communication control devices) 17, a timer 18, a post-authentication communication unit 19, and an electronic money information storage unit 20. The portable telephone 1 includes display panel, button, microphone, speaker and the like, which are interfaces for the user, but the configuration thereof will be omitted in FIG. 1.

The communication unit 11 communicates with a communication unit 41 of the register 2. In the present embodiment, the description is given on the assumption that the connection between the communication unit 11 of the portable telephone 1 and the communication unit 41 of the register 2 are automatically established by simply placing the portable telephone 1 over a presentation unit 2b having a non-contacting antenna of the register 2. A case of performing communication using the non-contacting IC will be described in the present embodiment, but is not limited thereto. Wireless or wired arbitrary communication form can be appropriately selected.

When receiving register ID (first communication equipment identifying information) identifying the register 2 from the register 2, to which the communication unit 11 is connected, the authentication control unit 12 stores the register ID as first register ID in a register ID storage unit 13, and instructs the authentication unit 14 to start the execution of the personal authentication of the user. The register ID may be data of arbitrary form as long as the register 2 can be identified. The register ID may be serial number of the register and the like.

The authentication unit 14 performs personal authentication of the user when receiving a command to start the authentication from the authentication control unit 12. Specifically, authentication is performed by urging the user to photograph the face image and comparing the face authentication (authentication image) photographed with a camera 15 and a registered image registered in the face image registration DB 16 in advance. Password etc. may be checked in addition to authentication of the face image.

After the authentication unit 14 succeeds in personal authentication of the user, and a register ID (second communication equipment identifying information) identifying the register is received from the register 2, to which the communication unit 11 is connected, the post-authentication communication control unit 17 assumes such register ID as the second register ID and determines whether or not the second register ID matches the first register ID stored in the register ID storage unit 13. The post-authentication communication control unit 17 permits post-authentication communication (settlement process communication) to the post-authentication communication unit 19 only when the two register IDs match.

After the authentication unit 14 succeeds in personal authentication of the user, the post-authentication communication control unit 17 references the timer 18 and makes the result of personal authentication by the authentication unit 18 invalid when a predetermined time has elapsed.

When communication is permitted by the post-authentication communication control unit 17, the post-authentication communication unit 19 communicates with the settlement unit 44 of the register 2 to perform the electronic money settlement process. The post-authentication communication unit 19 reflects the result of the settlement process on the electronic money information storage unit 20.

(Configuration of Register 2)

As shown in FIG. 1, the register 2 is configured including a communication unit (communication devices) 41, a register ID transmitting section (identifying information transmitting devices) 42, a register ID storage section 43, and a settlement unit 44. The register 2 has a communication function with the POS server and input interface and the like for the clerk, but the configuration thereof will be omitted in FIG. 1.

The communication unit 41 communicates with the communication unit 11 of the portable telephone 1.

The register ID transmitting section 42 transmits a register ID (communication equipment identifying information) identifying its own equipment prior to performing post-authentication communication when the communication unit 41 is connected to the communication unit 11 of the portable telephone 1. The transmission of the register ID is performed twice, once before performing personal authentication of the user in the portable telephone 1 and once after succeeding in the personal authentication.

(Flow of Process)

Figure 3:
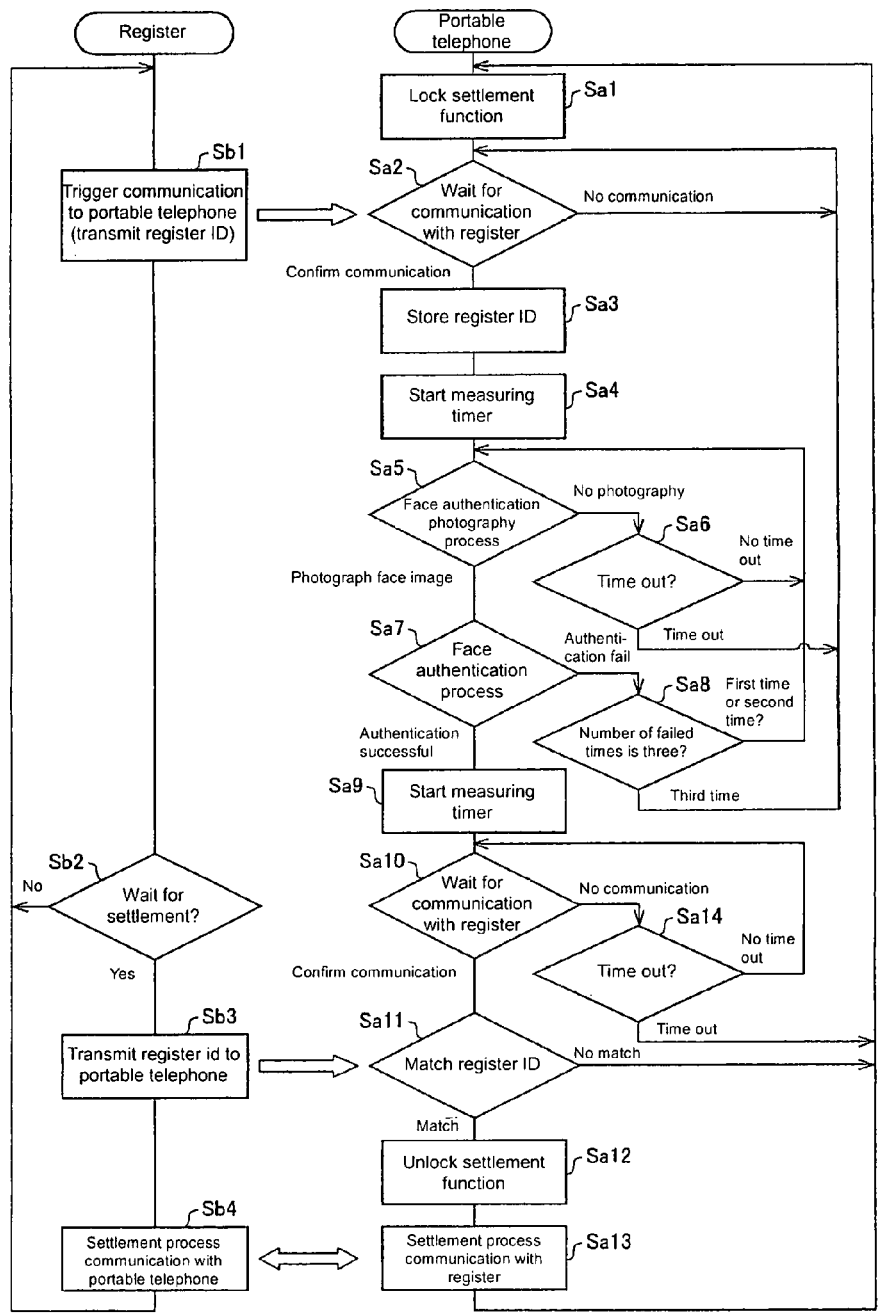
FIG. 3 shows a flow chart illustrating the flow of the process in the portable telephone and the register shown in FIG. 1.

The flow of processes in the portable telephone 1 and the register 2 will now be described with reference to the flowchart of FIG. 3.

When the portable telephone 1 is activated, the authentication function and the settlement function thereof are in the locked state (Sa1), and the portable telephone 1 waits for the communication to be established with the register 2 (Sa2). That is, in the portable telephone 1, the function of the post-authentication communication unit 19 is locked (invalid) by the post-authentication communication control unit 17, and the function of the authentication unit 14 is locked (invalid) by the authentication control unit 12 in the initial state.

When the user carrying the portable telephone 1 shops in a store and desires to pay with electronic money, the user places the portable telephone 1 over the presentation unit 2b of the register 2 following the instruction of the clerk after checking the payment amount on the display of the register 2. The connection between the communication unit 11 of the portable telephone 1 and the communication unit 41 of the register 2 is established by such operation, and the authentication control unit 12 of the portable telephone 1 stores the register ID (authentication start instructing information, first communication equipment identifying information) transmitted by the register ID transmitting section 42 of the register 2 (Sb1) in the register ID storage unit 13 (Sa3). The authentication control unit 12 outputs the authentication start instruction to the authentication unit 14 at this point.

The authentication unit 14 that has received the authentication start instruction from the authentication control unit 12 activates the camera 15, and presents message etc. urging the user to photograph the authentication face image (Sa5). The authentication unit 14 then activates the camera 15 and also starts to measure the elapsed time by a timer 18 (Sa4), and stops photographing the face image and transitions to communication waiting state with respect to the register 2 if the face image is not photographed within a predetermined time (time out) (Sa6). Therefore, spoofing is prevented from being carried out at a location distant from the register 2 by forcing the user to perform authentication within a predetermined time from when placing the portable telephone 1 over the register 2.

If the face image is photographed within a predetermined time, the authentication unit 14 performs face authentication of matching the photographed image with the registered image stored in the face image registration DB 16 (Sa7). If the authentication is successful, the result is notified to the post-authentication communication control unit 17.

If the authentication fails, the authentication unit 14 checks the number of times authentication has failed successively, and transitions to the communication waiting state with respect to the register 2 if authentication is being performed for the third time (Sa8). Therefore, spoofing is prevented from being carried out at a location distant from the register by forcing the user to perform authentication within a predetermined number of times from when placing the portable telephone 1 over the register 2. Obviously, the maximum value of the successively failed number of times can be appropriately selected.

When receiving a notification that authentication was OK from the authentication unit 14, the post-authentication control unit 17 presents message etc. urging the user to again place the portable telephone 1 over the presentation unit 2b of the register 2 for payment, and starts to measure the elapsed time with the timer 18 (Sa9).

When the user carrying the portable telephone 1 places the portable telephone 1 over the presentation unit 2b of the register 2, communication is established between the communication unit 11 of the portable telephone 1 and the communication unit 41 of the register 2 (Sa10, Sb2), and the post-authentication communication control unit 17 of the portable telephone 1 receives the register ID (second communication equipment identifying information) transmitted by the register ID transmitting section 42 of the register 2 (Sb3) and matches the register ID with the first register ID stored in the register ID storage unit 13 (Sa11).

If the two registers ID match, the post-authentication communication control unit 17 unlocks the function (settlement function) of the post-authentication communication unit 19 (Sa12). The post-authentication communication unit 19 of the portable telephone 1 then performs settlement process communication with the settlement unit 44 of the register 2 (Sa13, Sb4). Finally, after the end of the settlement process communication, the post-authentication communication control unit 17 immediately locks (make invalid) the function of the post-authentication communication unit 19 in the portable telephone 1, and the authentication control unit 12 locks (make invalid) the function of the authentication unit 14 to return to the initial state (Sa1, Sa2).

On the other hand, the post-authentication communication control unit 17 times out and returns to the initial state if the connection is not established between the communication unit 11 of the portable telephone 1 and the communication unit 41 of the register 2 within a predetermined time after succeeding in face authentication (Sa14).

Therefore, the authentication process must be unlocked first when performing the settlement process since the authentication process that is to be performed prior to the settlement process is locked (invalid) in the portable telephone 1. The following restrictions are imposed in unlocking the authentication process and the settlement process.

(1) The activation of face authentication cannot be performed through the operation of the user, and the portable telephone 1 must be placed over the presentation unit 2b of the register 2 in a store to start communication with the register 2. After the communication with the register 2 is started, the lock is released and the authentication process is activated.

(2) The photography of the face image in the authentication process can be tried only within a predetermined time after placing the portable telephone 1 over the register 2 in the store.

(3) After the face authentication succeeds and the settlement process is unlocked, the authentication process and the settlement process are automatically locked after a predetermined time has elapsed. Thus, the portable telephone 1 must again be placed over the presentation unit 2b of the register 2 in the store.

In the portable telephone 1 and the register 2 shown in FIG. 1, all of the face image photography function, face authentication function, and face image registration DB are equipped to the portable telephone 1.

However, the face authentication may be performed by mounting the face image photography function including the camera to the register 2 or the device in the store connected to the register 2, and transferring the photographed imaged data to the portable telephone 1.

Figure 4:
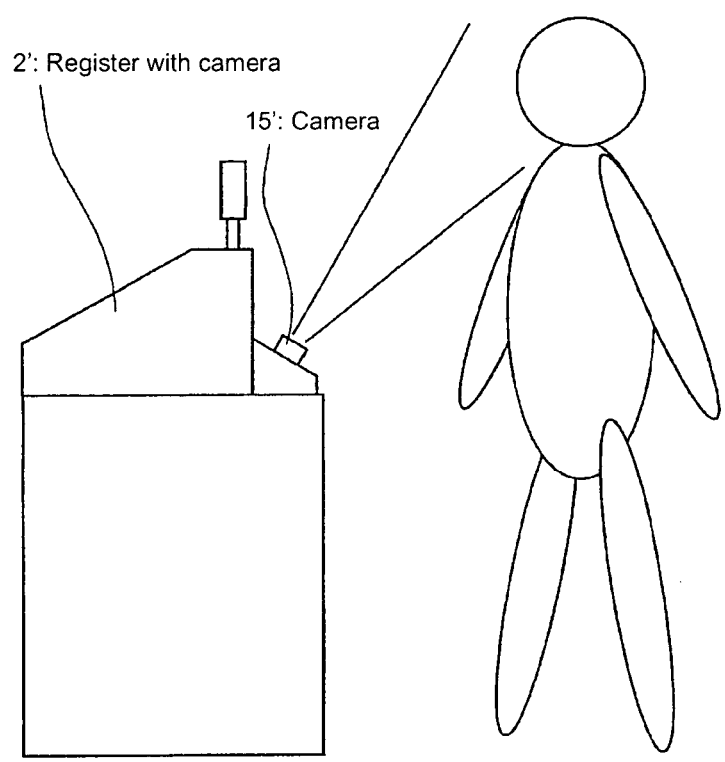
FIG. 4 is an explanatory view showing the outer appearance of a register with camera, which is a variant of the register shown in FIG. 1.

FIG. 4 is an explanatory view showing the outer appearance of a register equipped with camera 2' in which the face image photography function by the camera 15' is added to the register 2. In this configuration, the user first photographs the face image with the register 2', and thereafter, receives the data of the face image with the register ID when placing the portable telephone 1 over the presentation unit of the register 2' (Sa2 of FIG. 3). Sa5, Sa6 of FIG. 3 are thus omitted.

Therefore, the photograph of the authentication image is reliably performed at the store by installing the face image photography function to the register 2, whereby spoofing is more effectively prevented as it will attract public attention when attempting to carry out spoofing.

Furthermore, a configuration in which the face authentication function or the face authentication function and the face image registration DB are equipped in the register 2 side (or arrange a separate server for face image registration DB) is also considered. However, the security may become fragile since the authentication result is transmitted to the portable telephone 1, and the settlement function will be unlocked. In the configuration in which the face authentication function is equipped in the register 2, the register 2 and the portable telephone 1 must both be simultaneously version upgraded when version upgrading the software, and thus version upgrade is, in reality, impossible. In the configuration in which the face image registration DB is mounted on the register 2 side (server connected with a plurality of registers 2, or register 2 itself), management becomes complicating since the face image must be transmitted to the face image registration DB on the register 2 side when the user registers the face image.

Embodiment 2

Another embodiment of the present invention will now be described based on FIGS. 5 and 6. The same reference characters are denoted for the members having the same function as the members shown in embodiment 1 for the sake of simplifying the explanation, and the description thereof will be omitted. The terms defined in embodiment 1 are used according to the relevant definition in the present embodiment unless stated otherwise.

Figure 5:
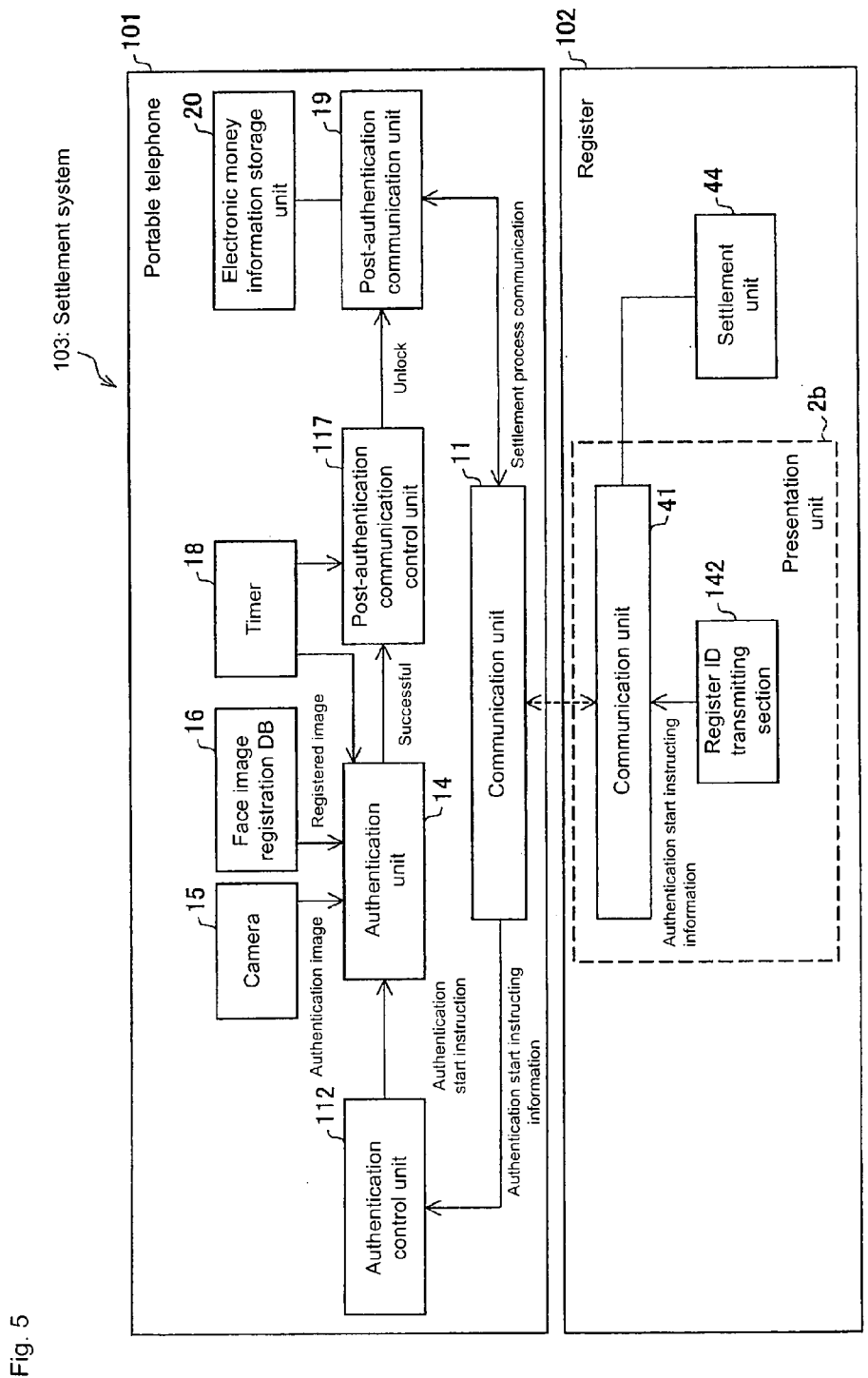
FIG. 5 shows a function block diagram showing a configuration of a portable telephone and a register according to another embodiment of the present invention.
Figure 6:
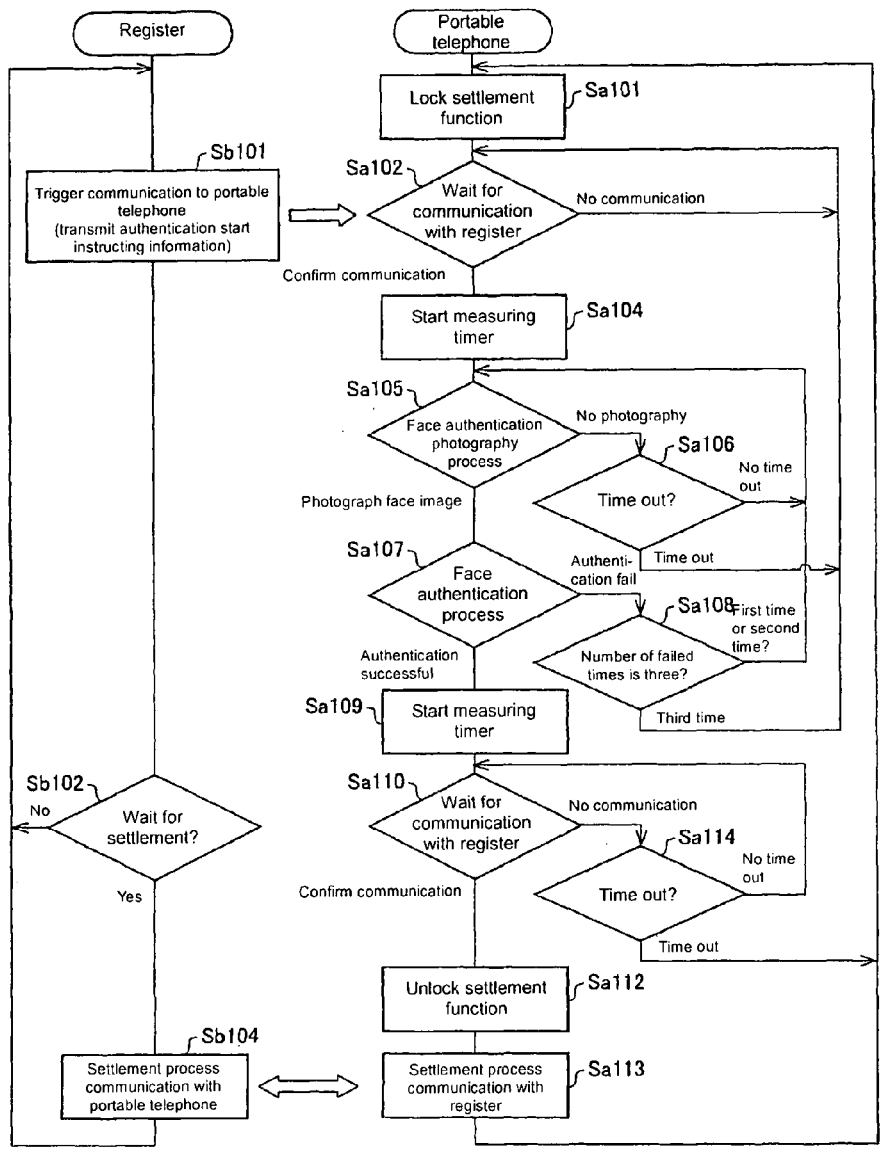
FIG. 6 shows a flow chart illustrating the flow of process in the portable telephone and the register shown in FIG. 5.

FIG. 5 is a functional block diagram showing the configuration of the portable telephone 101 and the register 102 of the settlement system 103 according to the present embodiment.

In the settlement system 103, the register 102 transmits the authentication start instructing information permitting the execution of the personal authentication of the user to the portable telephone 101 when the portable telephone 101 is connected to the register 102, and the portable telephone 101 performs personal authentication of the user after receiving the authentication start instructing information, whereby post-authentication communication is permitted between the portable telephone 101 and the register 102 only for a predetermined time after the portable telephone 101 succeeds in the personal authentication of the user.

Therefore, the present embodiment differs from the portable telephone 1 and the register 2 (FIG. 1) described in embodiment 1 in the following aspects. The register 102 includes an authentication start instructing section (authentication start instructing unit) 142 in place of the register ID transmitting section 42 and the register ID storage section 43 of the register 2. The portable telephone 101 includes an authentication control unit (authentication control devices) 112 and a post-authentication communication control unit (post-authentication communication control devices) 117 in place of the authentication control unit 12, the register ID storage unit 13 and the post-authentication communication control unit 17 of the portable telephone 1.

In the portable telephone 101, the authentication control unit 112 permits the execution of the personal authentication of the user to the authentication unit 14 when receiving the authentication start instructing information from the register 102, to which the communication unit 11 is connected. The post-authentication communication control unit 117 performs post-authentication communication only for a predetermined time after the authentication unit 14 succeeds in the personal authentication of the user.

In the register 102, the authentication start instructing section (authentication start instructing unit) 142 transmits the authentication start instructing information permitting the execution of the personal authentication of the user to the portable telephone 101 when the communication unit 41 is connected to the portable telephone 101.

(Flow of Process)

The flow of the process in the portable telephone 101 and the register 102 will now be described with reference to the flow chart of FIG. 6.

When the portable telephone 101 is activated, the authentication function and the settlement function are in the locked state (Sa101), and the portable telephone 101 waits for the communication to be established with the register 102 (Sa102). That is, in the portable telephone 1, the function of the post-authentication communication unit 19 is locked (invalid) by the post-authentication communication control unit 117, and the function of the authentication unit 14 is locked (invalid) by the authentication control unit 112 in the initial state.

When the user carrying the portable telephone 101 shops in a store and desires to pay with electronic money, the user places the portable telephone 101 over the presentation unit 2b of the register 102 following the instruction of the clerk after checking the payment amount on the display of the register 102. The connection between the communication unit 11 of the portable telephone 101 and the communication unit 41 of the register 102 is established by such operation, and the authentication control unit 112 of the portable telephone 101 receives the authentication start instructing information transmitted by the authentication start instructing section 142 of the register 102 (Sb101). The authentication control unit 112 outputs the authentication start instruction to the authentication unit 14 at this point.

The authentication unit 14 that has received the authentication start instruction from the authentication control unit 112 activates the camera 15, and presents message etc. urging the user to photograph the authentication face image (Sa105). The authentication unit 14 then activates the camera 15 and also starts to measure the elapsed time by a timer 18 (Sa104), and stops photographing the face image and transitions to communication waiting state with respect to the register 102 if the face image is not photographed within a predetermined time (time out) (Sa106). Therefore, spoofing is prevented from being carried out at a location distant from the register 102 by forcing the user to perform authentication within a predetermined time from when placing the portable telephone 101 over the register 102.

If the face image is photographed within a predetermined time, the authentication unit 14 performs face authentication of matching the photographed image with the registered image stored in the face image registration DB 16 (Sa107). If the authentication is successful, the result is notified to the post-authentication communication control unit 117.

On the other hand, if the authentication fails, the authentication unit 14 checks the number of times authentication has failed successively, and transitions to the communication waiting state with respect to the register 2 if authentication is being performed for the third time (Sa108). Therefore, spoofing is prevented from being carried out at a location distant from the register 102 by forcing the user to perform authentication within a predetermined number of times from when placing the portable telephone 101 over the register 102. Obviously, the maximum value of the successively failed number of times can be appropriately selected.

When receiving a notification that authentication was OK from the authentication unit 14, the post-authentication control unit 117 presents message etc. urging the user to again place the portable telephone 101 over the presentation unit 2b of the register 102 for payment, and starts to measure the elapsed time with the timer 18 (Sa109).

When the user carrying the portable telephone 101 places the portable telephone 1 over the presentation unit 2b of the register 102, communication is established between the communication unit 11 of the portable telephone 101 and the communication unit 41 of the register 102 (Sa110, Sb102). The post-authentication communication control unit 117 then unlocks the function (settlement function) of the post-authentication communication unit 19 (Sa112). The post-authentication communication unit 19 of the portable telephone 101 then performs settlement process communication with the settlement unit 44 of the register 102 (Sa113, Sb104). Finally, after the end of the settlement process communication, the post-authentication communication control unit 117 immediately locks (make invalid) the function of the post-authentication communication unit 19 in the portable telephone 101, and the authentication control unit 112 locks (make invalid) the function of the authentication unit 14 to return to the initial state.

On the other hand, the post-authentication communication unit 117 times out and returns to the initial state if the connection is not established between the communication unit 11 of the portable telephone 101 and the communication unit 41 of the register 102 within a predetermined time after succeeding in the face authentication (Sa114).

Each block of the portable telephone 1, 101 and the register 2, 102, in particular, the authentication control unit 12, 112, the post-authentication communication control unit 17, 117, the register ID transmitting section 42, and the authentication start instructing section 142 may be configured by hardware logic, or may be realized by software using CPU as described below.

That is, the portable telephone 1, 101 and the register 2, 102 includes a CPU (Central Processing Unit) for executing the command of the control program for realizing each function, a ROM (Read Only Memory) for storing the program, a RAM (Random Access Memory) for expanding the program, a storage device (recording medium) such as memory for storing the program and various data etc. The object of the present invention is also realized by supplying the recording medium, on which the program code (executable format program, intermediate code program, source program) of the control program (authentication program) of the portable telephone 1, 101 and the register 2, 102 or the software for realizing the above described function is computer readably recorded, to the portable telephone 1, 101 and the register 2, 102 and having the computer (or CPU or MPU) read and execute the program code stored on the recording medium.

The recording medium used may be tapes such as magnetic tape and cassette tape; discs including magnetic discs such as floppy Disc®/hard disc and optical disc such as CD-ROM/MO/MD/DVD/CD-R; cards such as IC card (include memory card)/optical card; or semiconductor memories such as mask ROM/EPROM/EEPROM/flash ROM.

The portable telephone 1, 101 and the register 2, 102 may be configured to be connectable to a communication network, and the program code may be supplied through the communication network. The communication network is not particularly limited, and internet, intranet, extranet, LAN, ISDN, VAN, CATV communication network, virtual private network, telephone line, mobile communication network, satellite communication network and the like may be used. The transmission medium configuring the communication network is not particularly limited, and wired medium such as IEEE 1394, USB, power line carrier, cable TV line, telephone line, ADSL line and wireless medium such as infrared line such as IrDA and remote controller, BLUETOOTH®, 802.11 wireless, HDR, portable telephone network, satellite line, terrestrial digital network and the like may be used. The present invention can be realized in the form of computer data signal embedded in the carrier wave in which the program code is realized in electronic transmission.

The present invention is not limited to each of the above embodiment, and various modifications within the scope of the claims are possible, and it should be recognized that embodiments obtained by appropriately combining the technical devices disclosed in each of the different embodiments are encompassed in the technical scope of the present invention.

The user equipment according to the present invention may be configured including a trigger unit for starting the authentication process by starting communication with the communication equipment, an input unit for acquiring authentication information from the user, a registration DB unit for storing authentication matching data in advance, an authentication unit for comparing the authentication information with the matching data registered in advance, and a determining unit for permitting settlement based on the matching result in the authentication unit. According to such configuration, the authentication is forced to be performed at a location in the store that attracts public attention, thereby effectively preventing illegal spoofing by photographs etc.

The user equipment according to the present invention may be configured including a trigger unit for starting the authentication process by starting communication with the communication equipment, an input unit for acquiring authentication information from the user, a registration DB unit for storing authentication matching data in advance, an authentication unit for measuring elapsed time from the start of authentication by the trigger unit and comparing the authentication information with the matching data registered in advance only within a predetermined time, and an authentication unit for measuring elapsed time from when the authentication was successful in the authentication unit and permitting settlement only within the predetermined time. According to such configuration, authentication is prevented from being carried out at a location distant from the store that does not attract public attention, thereby further effectively preventing illegal spoofing.

The present invention is applicable to a device that performs authentication for personal verification as it prevents spoofing in the authentication technique that uses telephone and the like.

What is claimed is:

1. A user equipment for performing post-authentication communication with a communication equipment after personal authentication of a user, the user equipment comprising:
   an authentication unit for performing the personal authentication of the user;
   a communication unit for communicating with the communication equipment by bringing the user equipment in proximity to the communication equipment;
   a communication equipment ID storage unit for storing first communication equipment identifying information;
   an authentication control unit for
      receiving the first communication equipment identifying information from the communication equipment connected to the communication unit,
      storing the first communication equipment identifying information into the communication equipment ID storage unit, and
      permitting the authentication unit to execute the personal authentication of the user after receiving the first communication equipment identifying information; and
   a post-authentication communication control unit for
      receiving second communication equipment identifying information identifying the communication equipment from the communication equipment connected to the communication unit within a first predetermined time after the authentication unit succeeds in the personal authentication of the user, and for permitting post-authentication communication only when the second communication equipment identifying information matches the first communication equipment identifying information,
      wherein the authentication control unit permits the authentication unit to receive authentication information input by the user and to execute the personal authentication of the user for a second predetermined time after receiving the first communication equipment identifying information,
      wherein the communication unit is disconnected from the communication equipment during the execution of the personal authentication of the user.

2. An authentication method in an authentication system, including a user equipment and a communication equipment, for performing personal authentication of a user of the user equipment before post-authentication communication; the method comprising the steps of:
   transmitting a first communication equipment identifying information for permitting execution of the personal authentication of the user from the communication equipment to the user equipment when the user equipment is connected to the communication equipment by bringing the user equipment in proximity to the communication equipment;
   permitting the user equipment to perform the personal authentication of the user for a first predetermined time after receiving the first communication equipment identifying information,
      wherein the user equipment is disconnected from the communication equipment during the execution of the personal authentication of the user;
   receiving authentication information input by the user;
   transmitting second communication equipment identifying information identifying the communication equipment from the communication equipment connected to the user equipment within a second predetermined time after the user equipment succeeds in the personal authentication of the user;
   determining whether the first communication equipment identifying information and the second communication equipment identifying information match; and
   permitting post-authentication communication only when the first communication equipment identifying information matches the second communication equipment identifying information.

3. The user equipment according to claim 1, wherein the post-authentication communication control unit permits the post-authentication communication for a third predetermined time after the authentication unit succeeds in the personal authentication of the user.

4. The user equipment according to claim 1, wherein the user equipment is disposed in an authentication system comprising a communication equipment for performing post-authentication communication with the user equipment after personal authentication of the user, the communication equipment comprising:
   a communication unit for communicating with the user equipment; and
   an authentication start instructing unit for transmitting authentication start instructing information permitting execution of the personal authentication of the user to the user equipment when the communication unit is connected to the user equipment.

5. The user equipment according to claim 3, wherein the user equipment is disposed in an authentication system comprising a communication equipment for performing post-authentication communication with the user equipment after personal authentication of the user, the communication equipment comprising:
   a communication unit for communicating with the user equipment; and
   an authentication start instructing unit for transmitting authentication start instructing information permitting execution of the personal authentication of the user to the user equipment when the communication unit is connected to the user equipment.

6. A computer program stored on a non-transitory computer readable recording medium and executable by a computer that instructs the computer to function as each element of the user equipment according to claim 1.

7. A computer program stored on a non-transitory computer readable recording medium and executable by a computer that instructs the computer to function as each element of the user equipment according to claim 3.

* * * * *

UNITED STATES PATENT AND TRADEMARK OFFICE
CERTIFICATE OF CORRECTION

PATENT NO.       : 8,526,915 B2
APPLICATION NO. : 11/724591
DATED            : September 3, 2013
INVENTOR(S)      : Kakiuchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1494 days.

Signed and Sealed this
Twenty-third Day of May, 2017

Michelle K. Lee
*Director of the United States Patent and Trademark Office*